No. 692,579. Patented Feb. 4, 1902.
J. A. WOTTON.
ELECTRIC GONG.
(Application filed June 8, 1901.)
(No Model.)
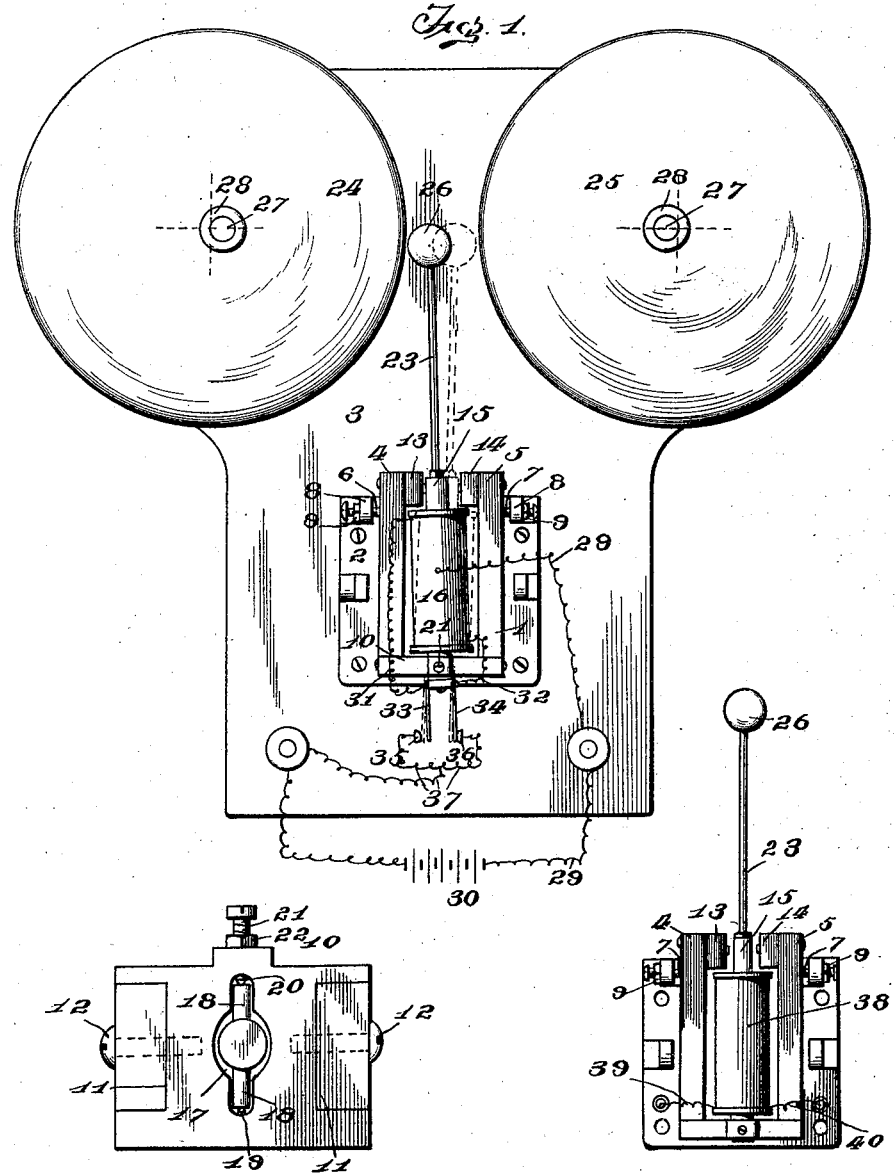

UNITED STATES PATENT OFFICE.

JAMES A. WOTTON, OF ATLANTA, GEORGIA, ASSIGNOR TO WOTTON ELECTRIC & MANUFACTURING COMPANY, A CORPORATION OF GEORGIA.

ELECTRIC GONG.

SPECIFICATION forming part of Letters Patent No. 692,579, dated February 4, 1902.

Application filed June 8, 1901. Serial No. 63,789. (No model.)

*To all whom it may concern:*

Be it known that I, JAMES A. WOTTON, a citizen of the United States, residing at Atlanta, in the county of Fulton and State of Georgia, have invented certain new and useful Improvements in Electric Gongs; and I do hereby declare the following to be a full, clear, and exact description of the invention, such as will enable others skilled in the art to which it appertains to make and use the same.

My invention relates to improvements in electric bells or gongs, and is so constructed as to be particularly well adapted for use where a loud and powerful tone is needed— as, for instance, in factories or places where there is considerable noise and confusion.

It consists in a bell mechanism provided with a permanent horseshoe-magnet and having a core of soft iron pivoted within the said magnet, so that it extends between the poles thereof, the said core being surrounded by a coil of wire, half of which is connected with a battery or other source of electricity in such a manner that the soft-iron core may be magnetized, so as to be drawn toward one pole of the horseshoe-magnet, the other half of the said coil being so connected with the battery or other source of electrical energy that the soft-iron core may have its polarity changed and be attracted by the other pole of the horseshoe-magnet, the said core carrying a tapper adapted to engage gongs of suitable structure.

It further consists in a bell mechanism made up of a horseshoe-magnet, a pivoted coil-wound core mounted so as to vibrate between the poles of the said magnet and carrying a tapper or hammer for acting upon suitable gongs, the said core being wound in two directions from the center and connected with a source of electrical energy, and means secured to the said core for making and breaking the circuit alternately in the opposite windings of the coil for changing the polarity of the core, and thereby producing the proper vibration thereof to ring the gongs.

It further consists in certain other novel constructions, combinations, and arrangements of parts, as will hereinafter be described and claimed.

In the accompanying drawings, Figure 1 is a front elevation of a bell mechanism embodying the present invention. Fig. 2 is an enlarged end view of the permanent magnet employed therein. Fig. 3 is a plan view of a tapper-vibrating mechanism adapted to be operated by an alternating current of electricity.

The bell mechanism which forms the subject-matter of the present invention is designed to produce a sounding device of far greater power than those commonly in use.

In carrying out the features of this invention I employ a permanent magnet 1, preferably a horseshoe-magnet, and adjustably mount the same upon a suitable frame 2, which may be attached to a back or support 3 of a suitable kind. The neutral end of the magnet 1 is preferably rigidly secured to the frame 2, while its pole ends 4 and 5 extend toward the other end of the frame and are engaged by set-screws 6 and 7, which are mounted in projecting standards 8 8 of the frame 2. By means of the set-screws 6 and 7 the poles of the magnet may be forced closer to each other or may be otherwise adjusted as may be found desirable, the poles of the said magnet being sufficiently long to permit of their being thus sprung out of their normal position. The set-screws 7 and 8 are preferably provided with binding-nuts, as 9 9, by which the said screws may be clamped in position after being adjusted. The magnet may be an integral structure; but I preferably form the same out of separate pole-pieces connected by means of a cross-bar 10, forming the neutral portion of the magnet. The bar 10 is for this reason formed with recesses 11 11 at each end to receive the ends of the pole portions of the magnet, which are securely held in the said recesses by means of screws 12 12. The pole ends of the magnet-arms are formed with inwardly-facing pole-pieces 13 14, which may also be made separate from the body portion of the magnet and be secured thereto by screws or suitable means.

Pivoted within the magnet 1 is a soft-iron core 15, which is wound for the greater portion of its length with a coil of wire, as at 16. One end of the core projects beyond the coil and extends into an aperture 17, formed in the magnet-plate 10. This end of the core is formed with oppositely-projecting arms 18 18, formed with sockets at their ends and adapted to engage pivot-points 19 and 20, carried by the magnet plate or bar 10. One of the pivot-points 20 is carried by a set-screw 21, which extends through a threaded aperture in the plate 10, so that the bearing upon which the pivoted core is mounted may be adjusted to properly hold the said core in place. A clamp-nut, as 22, is threaded on the said set-screw 21 for binding the same in its adjusted positions. The core will thus be seen to be pivotally mounted within the metal forming a part of the magnet, and in this way the lines of magnetic force traveling through the core and magnet will suffer little disturbance on account of the said connection. The recess 17 is preferably made as small as possible and so as to fit the end of the core and the arms 18, carried thereby, as closely as possible, so as not to interfere with the said lines of force any more than necessary. The free end of the core 15 projects between the pole-pieces 13 and 14 of the magnet, so that it may be attracted by one or the other, as the case may be. Projecting from the said free end of the core is an arm or rod 23, which projects between gongs 24 and 25, mounted on the back or base 3, the said arm carrying a tapper or hammer 26 for ringing the said gong when the arm 23 is vibrated between the same by means of the core 15. The amount of vibration given the core can be controlled by the set-screws 6 and 7. This adjustment will of course affect the extent of movement of the tapper 26, and it is necessary to adjust the gongs so as to receive a proper stroke from the said tapper. For accomplishing such adjustment I secure the gongs eccentrically to supporting-posts 27 27, the said gongs being perforated to one side of their center points, as indicated in dotted lines in Fig. 1 of the drawings. The gongs are clamped in position upon the said standards 27 by means of milled heads or nuts 28 28. By turning the gongs upon their standards it will be apparent that the distance of their peripheries from the extremes of the tapper-strokes can be adjusted to a nicety.

The coil 16 may be arranged so as to have its polarity changed when operated by a continuous current, as indicated in Fig. 1 of the drawings. For this purpose it is wound each way from the center, the winding being connected at the center by means of a wire 29 with a battery 30 or other source of a constant current. The outer ends of the core-winding are connected by means of wires 31 and 32 with contact-pieces 33 and 34, respectively, which are secured to the pivoted end of the core 15 and are vibrated slightly with the same. These contact-pieces 33 and 34 are preferably spring-pieces and are properly insulated from the core 15. The outer free ends of the contact-pieces 33 and 34 play between fixed contacts 35 and 36, which are both connected by suitable wiring, as 37, with the battery 30. One of the contact-pieces 33 and 34 will always be in contact with one of the fixed contacts 35 and 36, according to the position of the core 15. By means of this winding of the core in opposite directions the current from the battery may be passed first in one direction and then in the other around the said core, so as to change its polarity and cause it to be drawn first toward the north pole and then toward the south pole of the permanent magnet 1. By reference to Fig. 1 the circuits may be easily followed. As shown in the said drawings, the core 15 has just been drawn to the pole-piece 13, the spring-contact 34 thus being brought against contact 36. The current will thus be completed through the said contacts 34 and 36, the wiring 37, the battery 30, the wire 29, the lower winding on the core 15, and the wire 32, whereby the core will become charged, say, with a positive polarity and will no longer be attracted by the pole-piece 13 or north pole of the magnet, but will be repelled thereby and will be attracted at the same time by the pole-piece 14 or, say, the south pole of the magnet. As soon as the core reaches the pole-piece 14 the spring-contact 34 will be separated from the contact 36, and the spring-contact 33 will be brought against the contact 35. In the new position the current will be completed through the contacts 33 and 35, the wiring 37, the battery 30, the wire 29, and the upper winding on the core 15, and through the wire 31 to the contact 33 again. The upper winding of the coil 16 being in the opposite direction to the lower winding thereof, the polarity of the core will be changed, the said core being charged with negative electricity, so as to be no longer attracted by the south pole of the magnet, but repelled thereby and drawn toward the north pole of the magnet. The structure of the mechanism is therefore such that the polarity of the pivoted core will be continually changed automatically as long as a completed circuit is maintained through the battery or other source of electrical energy. It will be of course understood that any suitable press-button or other circuit-completing device can be interposed in the wire 29 or 37 for controlling the completion of the circuit through the bell mechanism in the usual way.

As shown in Fig. 3 of the drawings, the wiring of the core may be altered when an alternating current is used for operating the bell. In this instance the core is wound with one continuous winding all in the same direction throughout the length of the coil 38, the ends of the said winding leading in opposite directions from the coil, as at 39 and 40, and being connected up with the source of said alternating current in the usual way. Of course when employing an alternating current with the coil 38 the polarity of the core will be very rapidly changed in accordance with the pulsations of the said current and without the use of the contact-pieces 33 and 34 and without the two windings on the core.

The structure above described has proved in practice to be one of commercial value, the parts being so formed that they may be inexpensively made and are yet capable of splendid results. I find that a gong of this kind can be made so powerful as to be readily heard above the usual din and confusion of the workshop and factory and can therefore be used where the ordinary electric bell in common use would be of no value. The adjustment of the poles of the magnet to regulate the stroke of the core and tapper and the adjustment of the gongs to correspond form important features of this invention.

Having now described my invention, what I claim as new, and desire to secure by Letters Patent, is—

1. An electric bell mechanism, comprising a permanent magnet, a vibrating core mounted therein, a coil surrounding the said core and made up of windings having opposite directions, and means for passing the current through first one winding and then the other in different directions from the source of energy to change the polarity of the core and vibrate the bell-tapper, substantially as described.

2. A bell mechanism, comprising gongs and a tapper, a permanent magnet, a core pivotally secured within the neutral portion of the magnet, and projecting outwardly between the poles of the magnet, a coil surrounding the core and having oppositely-wound portions, and means passing an electrical current through first one portion and then the other of the said coil to change the polarity of the core and vibrate the tapper, substantially as described.

3. A bell mechanism, comprising oppositely-arranged gongs, a tapper adapted to vibrate between them, a permanent magnet, a pivoted core mounted within the magnet and having its free end extending between the poles of the magnet and carrying the said tapper, set-screws bearing against each of the pole ends of the magnet for adjusting their position with respect to each other to give the tapper a proper limit of vibration, and means for adjusting the gongs after the limit of vibration for the tapper has been established to correspond with the stroke of the said tapper, substantially as described.

4. A bell mechanism, comprising gongs and a tapper, a pivoted core carrying the said tapper, and a permanent magnet surrounding the core, the said core being pivoted to the magnet at its neutral portion, the said magnet being formed of arms carrying pole-pieces and a plate interposed between and connecting the ends of said arms and forming the neutral portion of the magnet, said connecting-plate being provided with an aperture for receiving the pivoted end of the core, needle-points for pivotally holding the core in position in said neutral plate, means for adjusting one of the needle-points to properly hold the core in position, and means for changing the polarity of the core comprising a coil surrounding the same and suitable connections for transmitting currents of electricity thereto, substantially as described.

5. A bell mechanism, comprising a permanent magnet, means for adjusting the poles thereof with respect to each other, to give a bell-tapper a greater or less range of movement as desired, a pivoted core adapted to move back and forth between the poles of the magnet, a tapper carried by the said core, gongs arranged on each side of the tapper the said gongs being eccentrically mounted so that they may be adjusted, after the stroke of the tapper has been determined so as to correspond with said stroke, by turning them upon their supports, and means for vibrating the core, substantially as described.

6. A bell mechanism, comprising a gong and tapper, a permanent magnet, a core pivoted therein so that its free end extends between the poles of the magnet, a coil surrounding the core and provided with windings extending in different directions, contact-springs carried by the pivoted end of the core and connected with the opposite windings of the coil, contacts for engaging said spring-pieces, and means for connecting both windings of the coil and both of the fixed contacts with a battery or other source of electrical energy, whereby a current of electricity will be sent alternately in different directions about the core for changing its polarity and vibrating the tapper, substantially as described.

In testimony whereof I hereunto affix my signature in presence of two witnesses.

JAMES A. WOTTON.

Witnesses:
J. O. HARDWICK,
D. M. EASTON.